Figure 1:
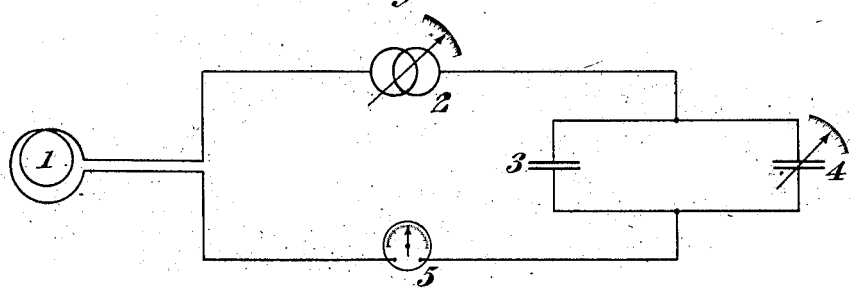

F. N. WATERMAN.
ELECTRICAL MEASURING INSTRUMENT.
APPLICATION FILED MAR. 23, 1917.

1,426,132.

Patented Aug. 15, 1922.

INVENTOR
Frank Nehemiah Waterman
BY
Sheppard & Betts
ATTORNEYS

UNITED STATES PATENT OFFICE.

FRANK N. WATERMAN, OF SUMMIT, NEW JERSEY, ASSIGNOR, BY MESNE ASSIGNMENTS, TO RADIO CORPORATION OF AMERICA, A CORPORATION OF DELAWARE.

ELECTRICAL MEASURING INSTRUMENT.

1,426,132.      Specification of Letters Patent.     Patented Aug. 15, 1922.

Application filed March 23, 1917. Serial No. 156,980.

*To all whom it may concern:*

Be it known that I, FRANK NEHEMIAH WATERMAN, a citizen of the United States, and a resident of the town of Summit, in the county of Union, State of New Jersey, have made certain new and useful Improvements in Electrical Measuring Instruments, of which the following is a specification.

The invention relates to an electrical measuring instrument and more particularly to an instrument for the direct reading of the decrements of damped oscillations and the direct reading of wave lengths.

The well known Bjerknes formula relating the decrements of two loosely coupled circuits is:

$$\delta_1 + \delta_2 = 2\pi \left(1 - \frac{n_r}{n_1}\right) \sqrt{\frac{I_1^2}{I_r^2 - I_1^2}}$$

Where:

$\delta_1$ = decrement of circuit under test per cycle.

$\delta_2$ = decrement of circuit of instrument per cycle.

$n_r$ = frequency at resonance.

$n_1$ = frequency off resonance.

$I_r^2$ = current squared at resonance.

$I_1^2$ = current squared off resonance.

If, in making the observations for substitution in this formula, the adjustment of the measuring circuit is made so that the square of the dissonant or off resonance current, $I_1^2$, is equal to some definite percentage of the value of the resonance current, $I_r^2$, the expression under the radical sign becomes a constant which may be unity if $I_1^2$ is made equal to one-half $I_r^2$.

The radical being thus reduced to a constant the formula becomes more convenient for use, by the substitution of the frequencies corresponding to $I_1$, and $I_r$, to calculate the value of $\delta_1 + \delta_2$. For still more convenient use the expression may be written in various forms, all approximately true if $n_1$ is only slightly different from $n_r$.

There are many different forms of the expression in common use, based upon the replacement of $n$ by C. L and $\lambda$ representing capacity, inductance and wave length of the measuring circuit respectively. The most usual of these forms are as follows:

$$(1) \quad \delta_1 + \delta_2 = \pi \frac{C_r - C_1}{C_1}$$

$$(2) \quad \delta_1 + \delta_2 = \pi \frac{C_2 - C_r}{C_2}$$

$$(3) \quad \delta_1 + \delta_2 = \pi \frac{C_2 - C_r}{C_2 + C_1}$$

Forms (4), (5) and (6) are identical with (1), (2) and (3) save that $L_r$, $L_1$ and $L_2$ replace $C_r$, $C_1$ and $C_2$.

$$(7) \quad \delta_1 + \delta_2 = 2\pi \frac{\lambda_r - \lambda_1}{\lambda_1}$$

$$(8) \quad \delta_1 + \delta_2 = 2\pi \frac{\lambda_2 - \lambda_r}{\lambda_2}$$

$$(9) \quad \delta_1 + \delta_2 = 2\pi \frac{\lambda_2 - \lambda_1}{\lambda_2 + \lambda_1}$$

In these expressions subscript r indicates a value of the quantity to which it is applied at resonance and subscripts 1 and 2, the values of the quantities to which they are applied at dissonant settings respectively for shorter and longer wave lengths of the measuring circuit.

Figure 2:
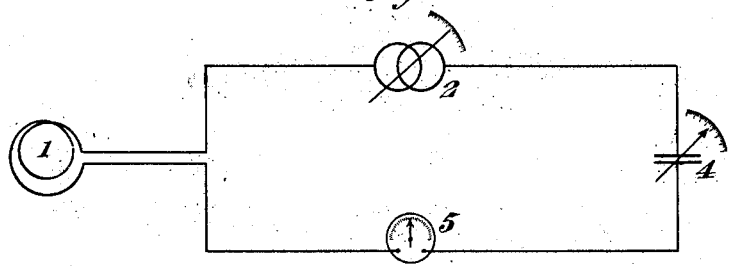
Figure 3:
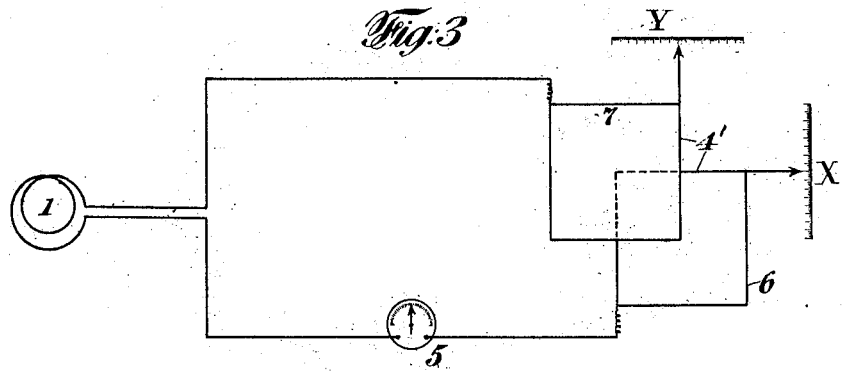

In the drawings Fig. 1 is a diagrammatic illustration of a circuit and arrangement of apparatus in accordance with the invention. Figs. 2, and 3 are modified arrangements.

The instrument to be described comprises a circuit and apparatus so arranged as to permit all the operations necessary in the application of one or more of these expressions in such a manner that a direct reading of the result without calculation, is possible, by attachment of direct reading scales to one or more of the variable elements.

The instrument may take various forms so long as it provides means arranged to permit keeping constant all but one of the quantities involved in the fraction, of any formula used. The fraction, and hence the equation, then has only one solution for each value of the remaining quantity. Thus if, in (3), $C_1$ is kept the same through any set of measuring operations, then for each value of $C_2$ there will be only one value of $\delta_1 + \delta_2$.

Fig. 1 illustrates one arrangement. In this figure 1 is an inductance coil, preferably having as small high frequency resistance and distributed capacity as practicable. It can advantageously be made detachable from the rest of the instrument and of such form as to be conveniently used as the coupling or exciting coil. A variable inductance, 2, conveniently of the variometer type and preferably so arranged as to have a pointer moving over a scale is also included in the circuit. The two inductances are connected in series and the circuit also contains two condensers, 3 and 4, preferably connected in parallel. There is also connected in the circuit an indicating instrument 5 giving indications proportional to the current or, preferably, to the current squared, but it is only necessary that some suitable indicating instrument be properly associated with the circuit for this purpose.

The condenser 3 is conveniently a fixed condenser of one of the well-known forms, having one or more fixed values. If more than one value is used then the device is made suitably adjustable by switch or plug connections. The condenser 4 is a variable condenser of any suitable form. Both condensers preferably have air dielectric, although this is not essential.

The determination of the decrement of a circuit, as for example, a wireless telegraph transmitter, may be carried out with this apparatus in accordance with formula (3) in the following manner:

The condenser 4 is set to its zero or minimum value. The coil 1 is placed in inductive relation with the exciting circuit but the variable inductance 2 screened from such action. For this purpose the coil 1 is preferably separate from the rest of the apparatus but connected thereto by a flexible cable of sufficient length so that, while coil 1 is in inductive relation, the variable inductance 2 is sufficiently distant to escape any appreciable influence. The meter circuit is then adjusted to resonance by the variometer 2 and the maximum value $I_r^2$, of the square of the current noted. The variometer is again adjusted, by decreasing the inductance 2, until the current squared is one-half its resonance value. The variometer is left in this last position.

It will be seen that these operations have been conducted with a fixed value of capacity and that the operations necessary to determine the value of the radical in the equation of Bjerknes have been performed. Hence, if the capacity be now changed so as to alter the wave length of the circuit to the other side of the resonant value until $I_1^2$ is again equal to one-half $I_r^2$, for the new value of capacity, $C_2$, there will be but one value of the equation for $\delta_1 + \delta_2$. Hence, if the value of condenser 3 is known, and 4 is a calibrated condenser, a scale for $\delta_1 + \delta_2$ can at once be calculated, calibration by comparison being unnecessary. Such a scale, graduated in terms of decrement, is directly attached to condenser 4 and when the adjustment for I has been made by means of 4, the sum $\delta_1 + \delta_2$ can be read directly from this scale. The instrument is thus direct reading.

Since a definite minimum capacity is wanted this is conveniently provided by the fixed condenser 3 since, if an instrument of limited range is wanted, a fixed capacity 3 costs less than one which is variable, while if a wide range of wave length is desired, a change of condenser 3 forms a convenient way of obtaining it. By substituting different coils 1 (as is common with commercial wave meters for changing range) and simultaneously changing the capacity of condenser 3 to a suitable corresponding degree a sufficiently close approximation to constancy of the decrement of the instrument can be attained so that for commercial purposes the scales can be made to read directly in terms of $\delta_1$, (provided that condenser 4 has a straight line calibration curve) thus eliminating the necessity of taking account of $\delta_2$ in interpreting the result. This is because the inductance of the variometer can, for ordinary ranges, be made so small that its adjustment will not make any large change in the value of $\delta_2$. As many scales reading decrement would in this case be applied to condenser 4 as there are values of condenser 3 and these could read directly in terms of $\delta_1$.

Fig. 2 shows an arrangement identical with Fig. 1 save that condenser 3 is omitted. It may be used precisely as just described by setting the pointer of condenser 4 at some definite point, say 120 degrees of the capacity scale while the manipulation of variometer 2 is being carried out and placing the zero point of the decrement scale coincident with this selected value.

The arrangement of either Figs. 1 or 2 may be used in accordance with formula (6) as follows:

Variometer 2 is first set at zero, i. e. at its minimum position, or at some other position chosen as the zero of a decrement scale and, using the variable condenser 4, the preliminary adjustment for $I_r^2$, and $I_1^2$ are made as above described. The final adjustment, namely that for $I_1^2$ equal to one-half $I_r^2$ on the opposite side of resonance, is then made by means of the variometer 2. It will be seen that since the adjustment for $I_r^2$, and $I_1^2$ are made with a constant value of $L_1$ there will be for every value of $L_2$, determined by variometer 2, only one value of $\delta_1 + \delta_2$. Hence, a scale reading this value directly, may be applied in this case to variometer 2.

It is convenient to have 2 and 4 both provided with scales, one reading decrement and the other wave lengths, or scales for both wave length and decrement may be added to either or both of these variable elements.

The arrangement of Figs. 1 and 2, may also be used in accordance with the other formulæ. A single illustration will enable those skilled in the art to understand the procedure.

Referring to Fig. 2, if the instrument is constructed for measurement by formula (5), for example, the pointer of variometer 2 would be set at zero on its scale and the circuit then adjusted for resonance by means of condenser 4 until the resonance current $I_r^2$, is noted. Variometer 2 would then be adjusted until, with an increased wave length, $I_1^2$ equals one-half $I_r^2$, (or other fraction for which the instrument is constructed). The value of the combined decrements can be then indicated by a suitable scale attached to the variometer 2. This is clearly the case since $L_r$ in formula (5) is fixed and there can be but one value of $\delta_1+\delta_2$ for each setting of variometer 2.

By selecting a mean position of variometer 2 for the zero value of the decrement scale, scales reading in both directions can be had and formulæ (4) and (5) can be used successively as is often desirable. The same thing can be done using formulæ (1) and (2) by selecting a mean position of condenser 4 as the zero of two scales reading in opposite directions.

In some cases it is more convenient to use wave lengths as in formulæ (7), (8) and (9). By providing variometer 2 with scales reading wave lengths and decrements (also inductance if desired) and condenser 4 with scales reading capacity and decrement (also wave length if desired) an instrument of a wide range of utility can be made as will be readily seen. For example wave lengths, decrements (by any one of a number of formulæ), capacity and inductances can all be measured and the values indicated upon direct reading scales. Since, as is well known, measurement of decrement is in effect a measurement of resistance, being a function thereof at a given frequency, a resistance scale can be furnished.

It will be readily seen that, in any of the formulæ above given, ratios can be substituted for absolute values. Thus, if in (3) we substitute for $C_2$ its equivalent $fC_1$, $f$ being defined as $\frac{C_2}{C_1}$, the fraction in equation (3) becomes $\frac{f+1}{f+1}$. The equation then becomes independent of the actual values of $C_1$ and $C_2$ and dependent only upon their ratio.

Fig. 3 shows an arrangement in which this fact is taken advantage of to produce a decremeter without the use of a variometer, the two variable tuning elements necessary being provided in a single condenser having two independent means of variation.

In Fig. 3, 1 is an inductance as in the other figures 4' is a condenser and 5 a suitable indicating instrument. The condenser 4' is diagrammatically indicated as consisting of two plates (or sets of plates) 6 and 7 movable with respect to one another. The plate 6 carries a pointer moving over the scale X, as the plate is moved up and down parallel to X and the plate 7 carries a pointer moving over the scale Y as the plate is moved to the right and left parallel to that scale. As shown, each plate has only one motion and the two plates are thus movable at right angles to one another.

The method of use, according to formula (3) is as follows:

The plate 7 is set at a definite position, which may be chosen at will in the design of the instrument, but once chosen must always be employed if the instrument is to be direct reading. This position may be assumed to be such that the pointer coincides with the right hand scale division. The instrument being loosely associated with the circuit to be measured, the plate 6 is moved until indicating instrument 5 indicates a maximum current and then moved to a position of greater capacity, (upwardly in Fig. 3) until the current is reduced so that $I_1^2=\frac{1}{2}I_r^2$. The value of $\delta_1+\delta_2$ will always be proportional to the alteration of position of plate 7 and the scale Y may be graduated directly in terms of decrement.

It will be seen that no matter in what particular position with reference to scale X the plate 6 may happen to be after its adjustment as just described, the movement of plate 7 a given distance will always produce a definite relative change, $f$, such that $\frac{C_2}{C_1}=f$. This movement therefore becomes a measure of $\delta_1+\delta_2$ as above pointed out.

It will be seen that in this condenser either motion moves the plate or group of plates into and out of coincidence with the other path of motion so that one motion may be said to cause the plates to vary the capacity of the condenser while the other varies the change of capacity due to a given extent of the first motion.

It is not necessary, of course, that both plates should be movable as it will be evident that one plate could have both movements and indicate upon two scales. I do not limit myself to any particular arrangement of the elements of the condenser as any arrangement may be employed provided that it has two independent modes of variation of its capacity and the variation due to one always effects a proportionate change of capacity no matter what position the other is in, within the limits of use. In practice it is desirable to avoid arranging the scales so as to make use for measuring purposes of that position where only the plate edges are in juxtaposition.

Since the range of capacity variation required for the decrement reading is or may be materially less than the full possible range of one means of variation, several positions of this adjusting means may be elected as zero positions and thus several decrement scales be provided. This gives a meter of several ranges. By providing several coupling coils 1 and changing capacity and inductance ranges simultaneously, an instrument of more nearly constant decrement over a wide range may be obtained.

In constructing the instrument in any of the forms illustrated, the particular frequency varying means which is used to carry the decrement scale may be made to have a smaller range of frequency varying effect than that used for the tuning and wave length measuring function. Thus if the variometer 2 is used to carry the decrement scale its inductance may be of small effect as compared to the frequency determining effect of coil 1 or of the capacity. This is advantageous in minimizing the possibility of unintentional coupling effect due to the variometer. Also with reference to Fig. 3 it will make for compactness if the movement used to indicate decrement is less extended than that desirable for wave length measurement and tuning.

It will be observed that I am able to obtain a direct reading instrument without requiring logarithmic or other specially shaped condenser plates and that, indeed, the ordinary forms with semi-circular or semi-cylindrical plates are to be preferred, since a straight line calibration curve is advantageous.

I do not limit myself to the particular details described nor to any precise form of mechanical embodiment as these may vary without departing from the substance of my invention.

In referring in my claims to a scale graduated to read decrements, I intend to include either decrement as ordinarily understood or a desired function thereof as, for example, resistance.

What I claim is:

1. In a measuring instrument for high frequency oscillations, an oscillatory circuit including a coupling coil, and two means for varying the frequency of said circuit, one of said means having a greater range than the other and the means of lesser range having a scale graduated in terms of decrement.

2. In a measuring instrument for high frequency oscillations, an oscillatory circuit of low decrement including a coupling coil and a condenser, said condenser having two means of varying its capacity one of said means indicating on a scale graduated in terms of decrement.

3. In a measuring instrument for high frequency oscillations, an oscillatory circuit of low decrement including a coupling coil and a condenser, said condenser having two means of varying its capacity and indicating with respect to two scales, one of which is graduated in terms of decrement.

4. In a direct reading decremeter, an oscillatory circuit including coupling means, a condenser in said circuit, said condenser having two independent means of capacity varying adjustment and comprising plates relatively movable into and out of juxtaposition by one motion to vary the capacity and relatively movable at an angle to the first named motion to vary the change of capacity due to a given extent of the first motion and a scale indicating the extent of one of said motions and graduated in terms of decrement.

5. In a measuring instrument an oscillatory circuit including a coupling coil and a condenser, said condenser having two means for independent capacity varying motions, one of said motions being at an angle to the other whereby a definite motion in one direction always produces a change of capacity, bearing a definite ratio to the capacity and a scale indicating the extent of one of said motions and graduated in terms of decrement produced by the other motion.

6. In a measuring instrument an oscillatory circuit including a coupling coil and a variable condenser, said variable condenser having two sets of plates, said sets movable in parallel paths into and out of juxtaposition to vary the capacity and movable at an angle to the aforesaid motion to also vary the capacity and a scale indicating the extent of one of said motions and graduated in terms of decrement.

7. In a measuring instrument an oscillatory circuit including a coupling coil and a variable condenser, said variable condenser having rectangular plates movable into and out of juxtaposition by two independent motions at right angles to one another whereby a definite motion in one direction produces a definite proportional change of capacity independent of the position in the other path of motion and a scale indicating the extent of one of said motions and graduated in terms of decrement.

8. In a measuring instrument an oscillating circuit including a coupling coil and a variable condenser, said variable condenser having plates relatively movable in parallel paths into and out of juxtaposition to vary the capacity and movable at an angle to the aforesaid motion to vary the change of capacity due to a given extent of the first motion and a scale indicating the extent of one of said motions and graduated in terms of decrement.

9. In a direct reading decremeter an oscillatory circuit including a coupling coil and a variable condenser, said variable condenser having two independent modes of capacity varying adjustment and comprising plates movable into and out of juxtaposition to vary the capacity and movable at right angles to the aforesaid motion to vary the change of capacity due to a given extent of the first motion and a scale indicating the extent of one of said motions and graduated in terms of decrement.

FRANK N. WATERMAN.